B. O. CUMMINGS & D. S. McARTHUR.
PLOW.
APPLICATION FILED JAN. 19, 1916.

1,199,668.

Patented Sept. 26, 1916.
2 SHEETS—SHEET 1.

WITNESSES:

INVENTORS
BENTON O. CUMMINGS,
DANIEL S. McARTHUR,
BY Munn & Co.
ATTORNEYS

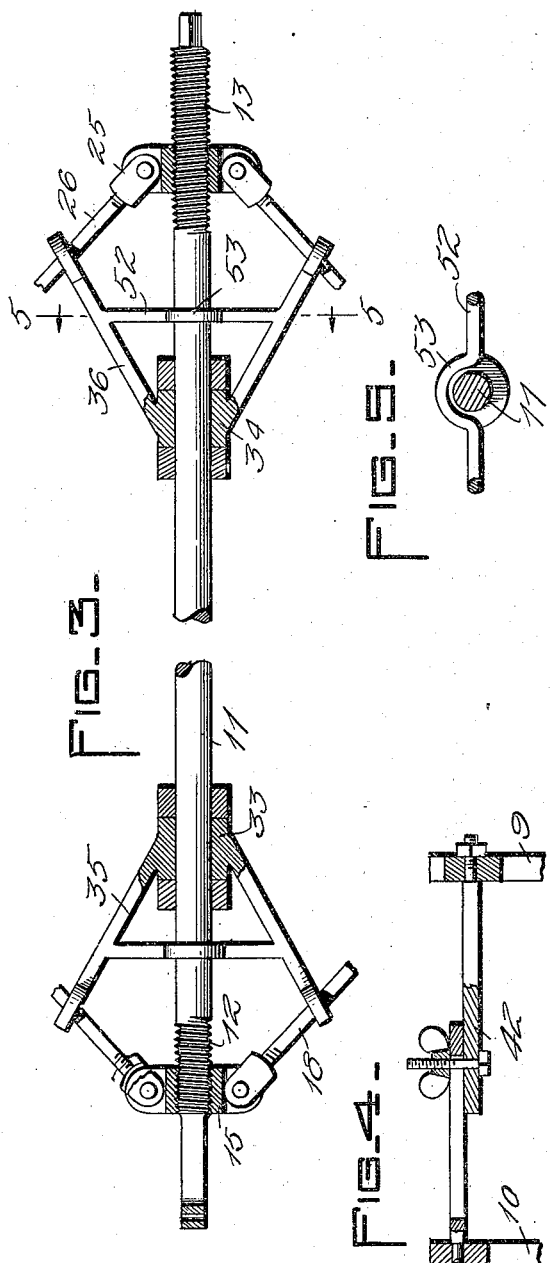

UNITED STATES PATENT OFFICE.

BENTON O. CUMMINGS AND DANIEL S. McARTHUR, OF PORTLAND, ARKANSAS.

PLOW.

1,199,668.

Specification of Letters Patent.  Patented Sept. 26, 1916.

Application filed January 18, 1916. Serial No. 72,731.

*To all whom it may concern:*

Be it known that we, BENTON O. CUMMINGS and DANIEL S. MCARTHUR, citizens of the United States, and residents of Portland, in the county of Ashley and State of Arkansas, have invented a certain new and useful Improvement in Plows, of which the following is a specification.

The principal objects of our present invention are to improve various details of construction and arrangement of parts of the plow forming the subject of our Patent 1149811, issued August 10, 1915, and to provide a plow capable of more efficiently accomplishing the purposes for which the original plow was devised.

With these and other objects in view which will become apparent as the description proceeds, the invention resides in the construction, combination, and arrangement of parts hereinafter more fully described and claimed, and illustrated in the accompanying drawings in which like characters of reference indicate like parts throughout the several figures, of which—

Figure 1 represents a top plan view of an improved plow constructed according to our invention. Fig. 2 represents a view in section taken vertically and longitudinally on the plane indicated by the line 2—2 of Fig. 1. Fig. 3 represents a detail plan view partially in section, of the adjusting shaft and associated parts. Fig. 4 represents a view in section taken vertically and transversely on the plane indicated by the line 4—4 of Fig. 1. Fig. 5 represents a view in section taken vertically and transversely on the plane indicated by the line 5—5 of Fig. 3. Fig. 6 represents a view in section taken vertically and transversely on the plane indicated by the line 6—6 of Fig. 1. Fig. 7 represents a fragmentary view in section taken vertically and transversely on the plane indicated by the line 7—7 of Fig. 1.

Referring more particularly to the drawings, the plow consists in its essential elements, as disclosed in the before-mentioned patent, of spaced beams 5 and 6 having light turning plows 7 and 8 respectively secured to their rear ends; handles 9 and 10 respectively secured in suitable manner to the landside of the plows for guiding them; a central adjusting shaft 11 arranged between the plow beams; and mechanism associated with the adjusting shaft for moving the plow beams toward and away from each other at will. This mechanism is described in detail in the before-mentioned patent, and it is thought therefore that a detailed description of the mechanism here, except in so far as improvements have been made, is not necessary.

The handles are provided with spaced adjusting means indicated in general at 42, and through the operation of which the handles may be retained in adjusted position relatively to each other.

In the improved arrangement the front adjusting arms 18, upper rear adjusting arms 26, and lower rear adjusting arms 27, are formed with eyes at their outer ends which engage with yokes 20 carried by bolts 21 which extend through and are secured to the plow beams 5 and 6 respectively. The inner ends of the upper rear spreading arms 26 have yokes 25 threaded on them instead of being integrally formed with them, as formerly, said yokes 25 being pivoted upon the ears 24 carried by the right hand threaded collar 23. The shaft 11 is provided at its front and rear ends with left and right hand tap threads 12 and 13 respectively. The collar 15 is mounted on the forward end of the adjusting shaft and carries the front adjusting arms 18 as formerly. In this instance, the outer ends of the arms 18 are set back a distance of about six inches from the front ends of the plow beams, rather than being connected to the plow beams at their front ends as formerly.

In the improved device, the sleeves 33 and 34 are each provided with a set screw 50 for more rigidly securing the sleeves in adjusted position on the shaft 11. The shaft along certain areas within probable range of adjustment of the sleeves, is squared or flattened as at 51.

In the improved device, the pairs of brace arms 35 and 36 carried respectively by the sleeves 33 and 34, are connected by a rod or bar 52 formed integrally with the brace arms, or formed separately therefrom and suitably secured thereto as desired. The rods 52 are bowed at their central portions as at 53, to accommodate the shaft 11. These rods serve, in bracing the arms, to rigidify the plow.

In the improved arrangement, the lower rear adjusting arms 27 instead of being made integrally with the adjusting arms 26, are made separately therefrom, and at their inner ends are provided with eyes 54 which fit over a depending threaded lug 55 carried on the collar 23. At the base of the lug the collar is flattened, so as to snugly receive the uppermost eye 54. A nut 56 threaded on the lug retains the eyes in place. This construction removes some of the strain from the ears 24 and yokes 25, and more evenly distributes the strain through the collar 23 and arms 26 and 27.

Although we have described the preferred embodiment of our improved plow, we may desire to make such changes in the construction, combination, and arrangement of parts thereof, as do not depart from the spirit of the invention and the scope of the appended claims.

We claim:—

1. A plow including spaced plow beams, an adjusting shaft arranged between them and adapted to be rotated at will, said shaft being threaded at one end, a collar through which the said threaded end extends, said which the said threaded end extends, said collar being provided with ears, upper adjusting arms pivotally connected with the ears and with the plow beams, a lug provided on the collar at a point midway between the ears, and lower arms pivotally mounted at their inner ends on the lug and being pivotally connected at their outer ends with the plow beams.

2. A plow including spaced beams, an adjusting shaft arranged between them, a collar adjustable on the shaft, upper adjusting arms pivotally connected at their inner ends with the collar and at their outer ends with the shaft, and lower adjusting arms pivotally connected at their inner ends with the collar at a point midway between the connecting points of the upper adjusting arms with the collar, and at their outer ends with the beams.

3. A plow including spaced beams, an adjusting shaft arranged between them, upper adjusting arms pivotally connected at their outer ends with the beams near their upper edges, said beams having their rear ends extending downwardly, lower adjusting arms pivotally connected at their outer ends with the beams adjacent the lower terminals of their downturned rear ends, and a collar adjustable on the shaft with which the upper adjusting arms are pivotally connected at spaced points and with which the lower adjusting arms are pivotally connected at a point spaced from the connecting points of the upper adjusting arms with the collar whereby the beams will be rigidly retained against movement relatively to the collar.

BENTON O. CUMMINGS.
DANIEL S. McARTHUR.

Copies of this patent may be obtained for five cents each, by addressing the "Commissioner of Patents, Washington, D. C."